July 23, 1963 PER BÖRJE FONDÉN ETAL 3,098,629
SHOCK ABSORBER FOR AIRPLANE ARRESTING DEVICES
Filed Jan. 21, 1960

Inventors,
Per B. Fondén,
Karl O. T. Wålander
by Sommers + Young
Attorneys

United States Patent Office 3,098,629
Patented July 23, 1963

3,098,629
SHOCK ABSORBER FOR AIRPLANE
ARRESTING DEVICES
Per Börje Fondén, Hejdegatan 3, and Karl Ove Torgny
Wålander, Vasavagen 49, both of Linkoping, Sweden
Filed Jan. 21, 1960, Ser. No. 3,937
2 Claims. (Cl. 244—110)

The present invention relates to devices for preventing the runaway of airplanes in landing and more particularly to that type of such devices which comprises an arresting net suspended in a substantially vertical plane between a pair of masts and connected at both ends to braking mechanisms. In connection with arresting nets for airplanes it has proved difficult to avoid the appearance of heavy pushes or shocks during the arresting operation. Such shocks cause increased stresses on the net and the arresting system as a whole. Attempts made with a view to allowing a more liberal dimensioning of the structures involved have entailed a concurrent increase in the power of the shocks occurring, since these are highly dependent on the magnitude of the movable masses of inertia forming part of the structures. For this reason some special designs involving extremely low movable masses of inertia have been developed.

Proposals have already been made to solve the problem above indicated by the insertion of shock absorbing means between the net and each braking device. In order that such an arrangement of shock absorbing means may operate satisfactorily, however, the shock-absorbing means should satisfy special requirements. Thus, the weight of said means must be as low as possible, in order not to increase the harmful mass of inertia of its own accord. This requirement is very rigorous, because of the fact that the shock absorbing means are capable of performing transverse oscillations which, to some extent, are susceptible of inducing disturbances of the very kind one wants to eliminate. An essential feature of the construction must be that the ratio of the weight per unit length of the shock-absorber to that of the connecting means between the respective end of the arresting net and the respective braking mechanism is reduced to a minimum.

Furthermore, the shock-absorber should be so designed as to yield smoothly as the pull exceeds a force between the normal braking forces as applied by the main brake mechanism and the rupture strength of the cables or tapes. Thus it should function like a sort of mechanical relief valve.

The object of the invention is to provide a shock absorber which satisfies the above stated requirements.

The invention is illustrated by way of example in the accompanying drawings, in which.

Figure 1:
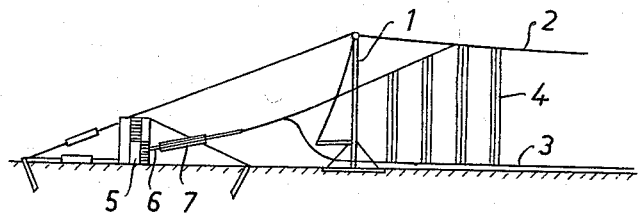
FIG. 1 is a side elevation of one end portion of an arresting net and an associated shock-absorber.

The net is suspended in a substantially vertical palne between a pair of preferably tiltable masts, one of which only is shown in FIG. 1 where it is designated by the reference numeral 1. The net comprises a top wire 2, a bottom wire 3, and a set of vertical connecting wires 4 therebetween. The reference numeral 5 designates a brake mechanism which may, for instance, be of the drum type.

Such a brake mechanism is provided in front of each end of the net and is connected to the respective united ends of the top and bottom wires 2 and 3 of the net by means of a wire 6 and a shock-absorber 7 in series therewith.

Figure 2:
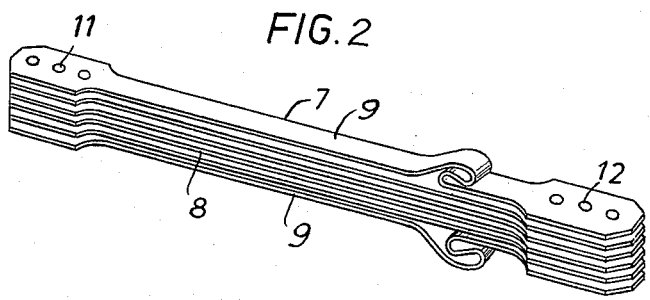
FIG. 2 is a perspective view of a shock-absorber according to the invention.
Figure 3:
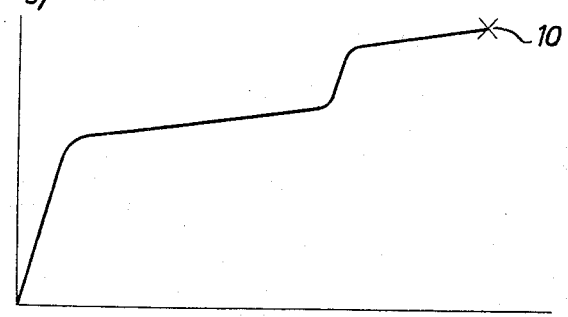
FIG. 3 is a tension-to-elongation curve.

A form of a shock-absorber suitable for this purpose is shown in FIGS. 2 and 3.

The shock-absorber shown in FIG. 2 which is indicated as a whole by the reference numeral 7 comprises a plurality of straps 8 made of a special material the tension-to-elongation curve of which is equal to or like that shown in FIG. 3. As shown, said curve is initially very steep and merges thereafter rather abruptly into a flat but continuously gradually rising portion. Certain grades of stainless steel may, for instance, be caused to render a tension-to-elongation curve of such configuration.

The dimensions of this shock-absorber are chosen with a view to causing the knee between the steep and the flat portions of the tension-to-elongation curve to correspond to a pull which is slightly above the normal design value, and at the same time, is slightly below the value at which a rupture is assumed to occur in the structure.

In order to increase the margin up to the breaking load for the shock absorber proper, thereby enabling uitlization of a larger portion of the elongation of the material as well as of the energy absorption capacity of the material, the construction shown in FIG. 2 includes two straps 9 of a greater length than the remaining straps. The additional lengths of said straps are looped into re-entrant folds as shown. In the initial stage of elongation of the strap assembly, said folds will be straightened out by taking up load. As soon as the longer straps have been straightened out, they will afford a substantial contribution to the overall load-carrying capacity of the strap assembly. As a result, as shown in FIG. 3, the tension-to-elongation curve of the strap assembly as a whole will present a second steeply rising portion followed by a flat portion up to a point 10, where subsequent rupture might be expected to occur. The brake wire 6 and the top and bottom wires 2 and 3 of the net may be connected to the end portions 11 and 12, respectively, of the strap assembly.

A characteristic feature of the shock absorber above described is a low weight per unit of length as compared with the weight of the wires of the net. If it were possible to choose the same material for the straps of the shock absorber assemblies as that used for said wires, then it would be theoretically possible (provided the connections, end pieces, etc. were considered weightless) to get a weight of the structure shown in FIG. 2 equal to that of a wire dimensioned for an equal safety factor. In actual practice a weight amounting to 1.3–1.6 of that of such a wire is obtainable.

We claim:
1. A device for preventing the runaway of airplanes in landing comprising in combination, an arresting net, a pair of tiltable masts, means for suspending said net in a substantially vertical plane between said masts, a braking mechanism having a large static inertia located in front of each end of said net, connections between the ends of the net and said braking mechanism, and shock absorbing assemblies inserted in said connections, having small static inertia compared with that of said braking mechanism, and becoming active only when the net is subjected to loads exceeding normally existing loads which may be attended to by said braking mechanism, said shock absorbing mechanism comprising means for transforming kinetic energy into heat, said shock absorbing assemblies each comprising a set of straps made of a material which on tensional load gives a characteristic tension-to-elongation curve including a first sharp steep portion and a less steep and nearly horizontal second portion.

2. A device as claimed in claim 1, in which the set of brake straps include supplementary straps of a greater length than the remaining straps, which in their inoperative position are folded so as to present a length corresponding to that of the remaining straps.

References Cited in the file of this patent

UNITED STATES PATENTS

| | | |
|---|---|---|
| 2,465,936 | Schultz | Mar. 29, 1949 |
| 2,483,655 | Schultz | Oct. 4, 1949 |
| 2,762,586 | Van Zelm | Sept. 11, 1956 |
| 2,854,201 | Cotton | Sept. 30, 1958 |
| 2,913,197 | Fonden et al. | Nov. 17, 1959 |
| 2,987,278 | Hoffman et al. | June 6, 1961 |

FOREIGN PATENTS

| | | |
|---|---|---|
| 752,017 | Great Britain | July 4, 1956 |